United States Patent [19]
Mueller et al.

[11] Patent Number: 6,059,495
[45] Date of Patent: May 9, 2000

[54] ENGRAVING APPARATUS

[75] Inventors: Michael A. Mueller, Phoenix; Warren W. Stansberry, Peoria; Bradley D. Carlson, Glendale, all of Ariz.

[73] Assignee: Axxess Technologies, Inc., Tempe, Ariz.

[21] Appl. No.: 09/046,593

[22] Filed: Mar. 24, 1998

[51] Int. Cl.[7] .................................................. B65G 59/00
[52] U.S. Cl. ......................... 409/197; 221/124; 409/225
[58] Field of Search .................................. 409/132, 225, 409/227, 221, 222, 223, 224, 131, 197; 29/33 P; 221/123, 124

[56] References Cited

U.S. PATENT DOCUMENTS

| | | | |
|---|---|---|---|
| 4,664,570 | 5/1987 | Tsukiju et al. | 409/84 |
| 5,346,341 | 9/1994 | Jambor | 409/132 |
| 5,429,461 | 7/1995 | Mukherjee et al. | 409/163 |
| 5,569,003 | 10/1996 | Goldman et al. | 409/132 |
| 5,810,526 | 9/1998 | Hirai | 409/131 |

*Primary Examiner*—Daniel W. Howell
*Attorney, Agent, or Firm*—Finnegan, Henderson, Farabow, Garrett & Dunner, L.L.P.

[57] ABSTRACT

An engraving apparatus for engraving a workpiece selected by a user. The workpieces are contained in storage columns and biased into a shuttle by a spring system mounted externally to each storage column. The shuttle is moved by the engraver between loading, engraving, and dispensing positions. The workpieces are clamped during the engraving process by a piston and cam arrangement, which provides the desired clamping force yet can be disengaged to facilitate movement of the shuttle by the engraver.

23 Claims, 18 Drawing Sheets

ENGRAVING APPARATUS

BACKGROUND OF THE INVENTION

The present invention relates generally to the field of engraving. More particularly, the invention relates to an automated engraving apparatus.

A problem in the field of engraving is the lack of skilled engravers available to perform engraving operations. Prior to the introduction of automated engraving machines, engravers were required to have knowledge of workpiece selection, cutting speeds, and workpiece fixturing. Engravers were also required to have some level of manual dexterity to physically engrave the workpiece. The automated engraving machine resolves a number of these problems and reduces the skill level required of an operator. Based on input from an operator, the automated engraving machine can retrieve the proper workpiece from a storage area, position and clamp the workpiece, and then engrave and dispense the workpiece -all with limited action on the part of the operator.

In general, however, the presently available automatic engraving machines are unnecessarily complex with respect to the number of parts required and the required maintenance. U.S. Pat. No. 5,569,003 to Goldman discloses one example of an automated engraving machine. While this prior art engraving machine is suitable for its intended purpose, the design of the machine is unnecessarily complex. In particular, this design is complex in that multiple motors are required to position and engrave the workpieces. This is true, in part, because of the structural arrangement between the shuttles, which transport the workpieces, and the clamping mechanism used to clamp the workpiece during the engraving process. Ideally, the shuttles should move easily between their various positions without friction from contacting the clamping mechanism.

Another potential area for improvement over prior art machines involves a reduction in the footprint size of the apparatus. These automated vending machines can be placed inside specialty or department stores to allow customers to purchase a personally engraved item without having to enlist an operator to perform the engraving operation. However, to achieve maximum potential, such machines must be small enough to fit into the aisles of the stores so that customers can have access to the machines without the machines interfering with the operation of the stores. The machines currently known consume a significant amount of floor space and are cumbersome to position in many locations inside of a store.

In light of the foregoing, there is a need for an automated engraving machine that is simple to construct, easy to maintain, and compact in size.

SUMMARY OF THE INVENTION

Accordingly, the present invention is directed to an engraving apparatus that substantially obviates one or more of the limitations and disadvantages of prior art engraving machines. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to an engraving apparatus comprising a plurality of workpiece storage columns, each of which is capable of storing a plurality of blank workpieces. An anvil is provided having a plurality of bores. A plurality of shuttles is provided, each of which is operable to move one of the workpieces from each of the storage columns to a corresponding bore in the anvil. To clamp the workpiece, there is provided at least one clamp piston having a head sized to fit through the bore in the anvil and a cam operable to move the pistons such that when a workpiece is over one of the bores in the anvil, the workpiece will be clamped against the shuttle by one of the clamp pistons.

According to another aspect, the invention is directed to an engraving apparatus comprising an engraver, at least one workpiece storage column for holding a plurality of workpieces, and a shuttle. The shuttle includes a bore and a recess configured to receive a workpiece from the storage column. The shuttle is movable between a loading position and an engraving position. The engraver is movable into contact with the shuttle to move the shuttle from the loading position to the engraving position.

In still another aspect, the invention is directed to an engraving apparatus comprising an engraver, at least one workpiece storage column, and a shuttle for moving a workpiece from the storage column to an engraving area. Each workpiece storage column has a spring external to the workpiece storage column, such that the spring exerts a force upon the plurality of workpieces in the storage column thereby urging the workpieces toward one end of the column.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

FIG. 3b is a top view of the support structure of FIG. 3a;

DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, an engraving apparatus is provided to engrave a workpiece. The engraving apparatus of this invention is particularly useful in a self-service vending machine installation, although an operator-assisted engraving apparatus may nonetheless utilize the present invention. An example of a self-service engraving machine that may utilize the present invention is shown in U.S. Pat. No. 5,569,003, which is hereby incorporated by reference. U.S. Pat. No. 5,569,003 discloses the overall structure and operation of a self-service engraving machine and its disclosure of, inter alia, the software system and the basic structural components of such a machine will not be repeated.

The engraving tool used in the engraving apparatus may be of any type generally known in the art. There is disclosed, by way of example, a scribe engraver. Other types of engraving tools that may be utilized include a cutting tool or a laser engraver.

Figure 1:
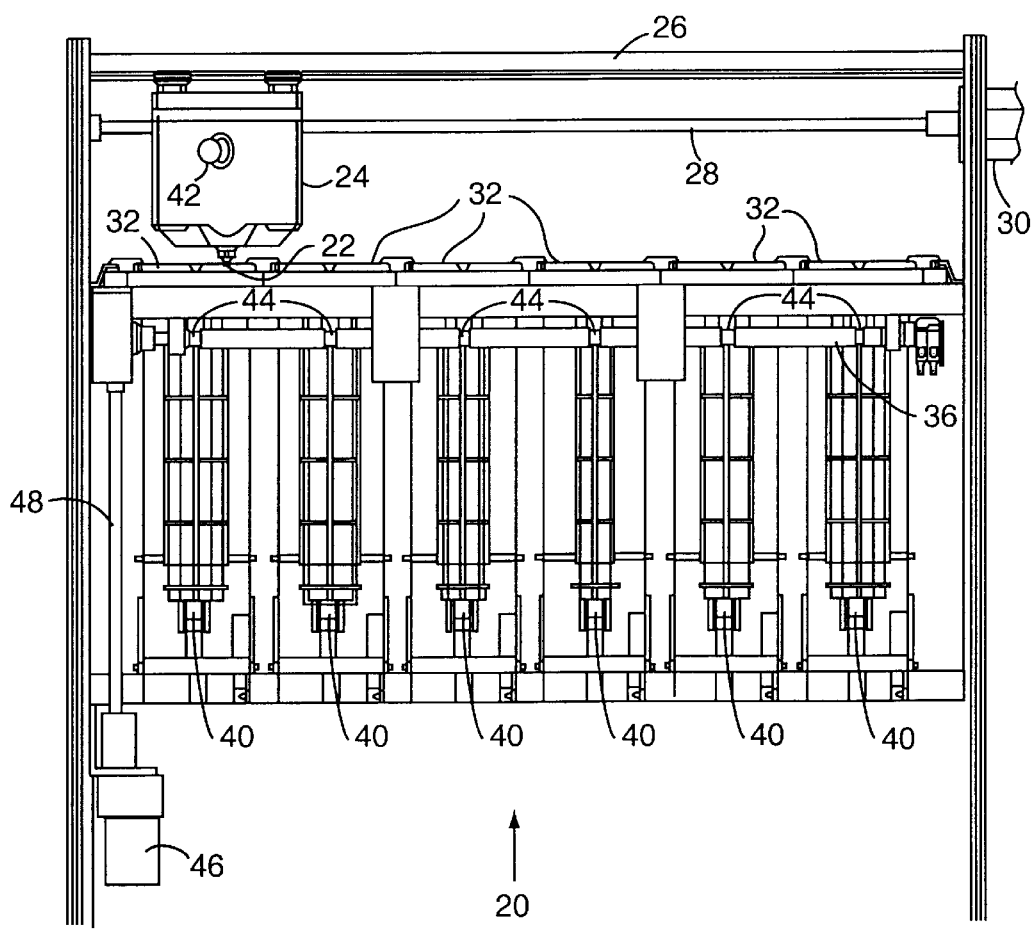
FIG. 1 is a front pictorial view of an engraving apparatus of the present invention.

The presently preferred embodiment of the engraving apparatus of the present invention is shown in FIG. 1 and is designated generally by reference numeral 20. As embodied herein and referring to FIG. 1, the engraving apparatus 20 comprises an engraver 22, which is movable in the X, Y, and Z directions. A support structure 24 is moved in the X-direction along bridge 26 by lead screw 28 and stepper motor 30.

Figure 2:
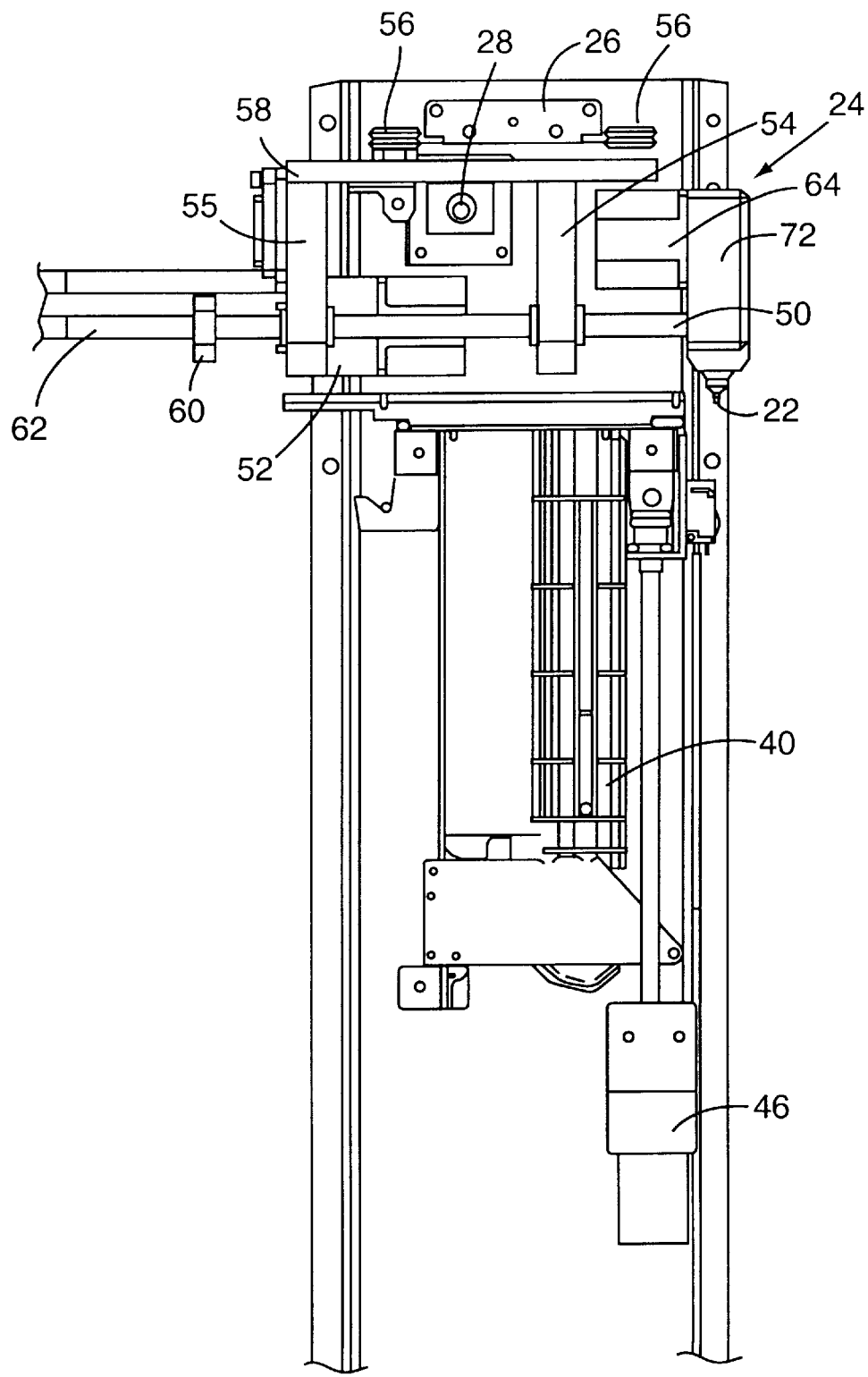
FIG. 2 is a side pictorial view of the engraving apparatus of FIG. 1.
Figure 3A:
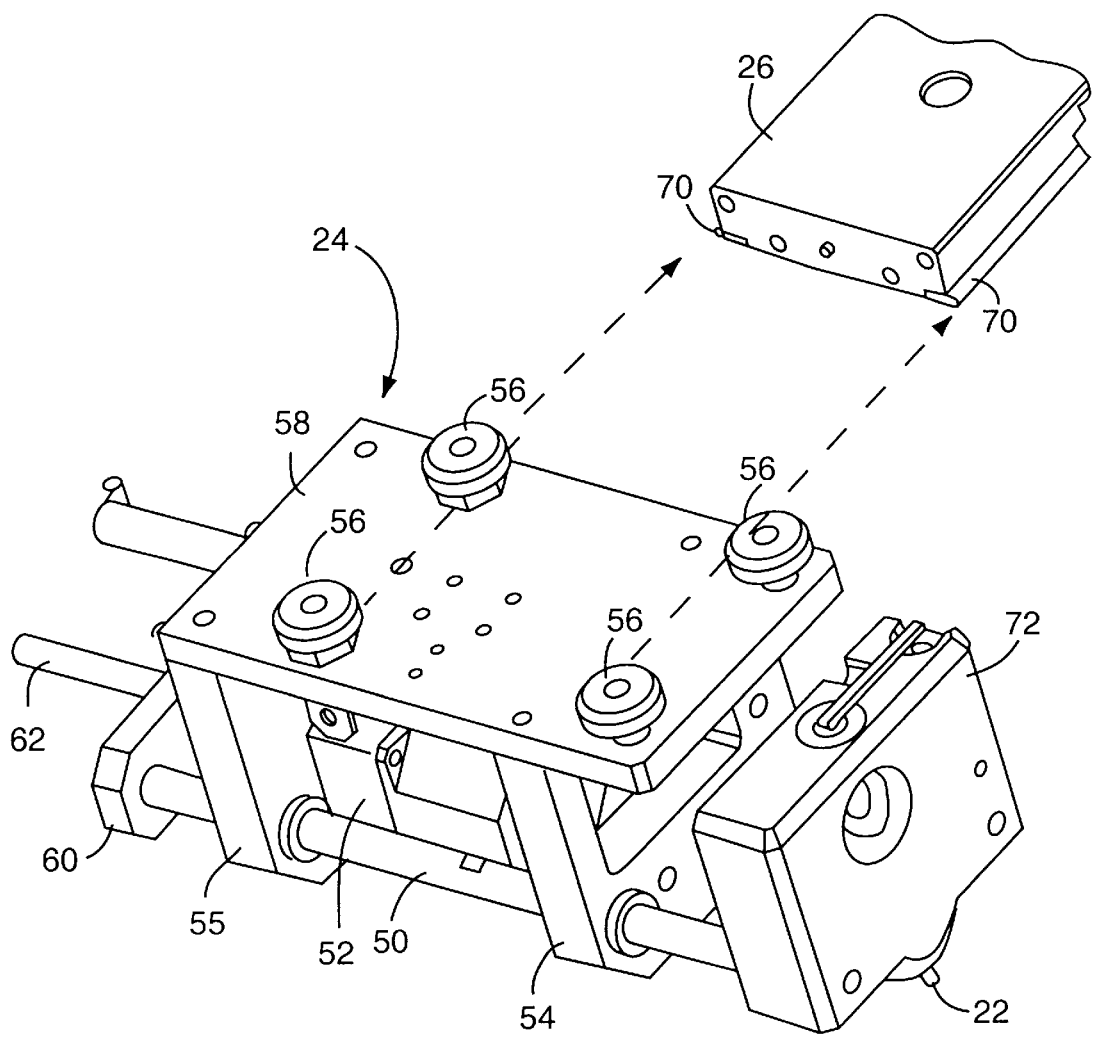
FIG. 3a is an exploded view of the support structure for the engraver.

As best shown in FIG. 2, the support structure 24 has a base plate 58 connected to a front support member 54 and a rear support member 55. Rollers 56 are mounted on top of the base plate 58 and engage the bridge 26. As best shown in FIG. 3a, the rollers 56 engage and move within grooves 70 on either side of the bridge 26. Thus, as stepper motor 30 and lead screw 28 operate to move support structure 24 in the X-direction, the structure slides along bridge 26. This is the manner in which engraving is accomplished in the preferred embodiment, as well as the manner in which engraver 22 is moved to the appropriate workpiece storage column. The present invention, however, can be utilized on apparatus in which the workpiece, rather than the engraving tool, is moved in the X, Y, or Z directions.

Figure 3B:
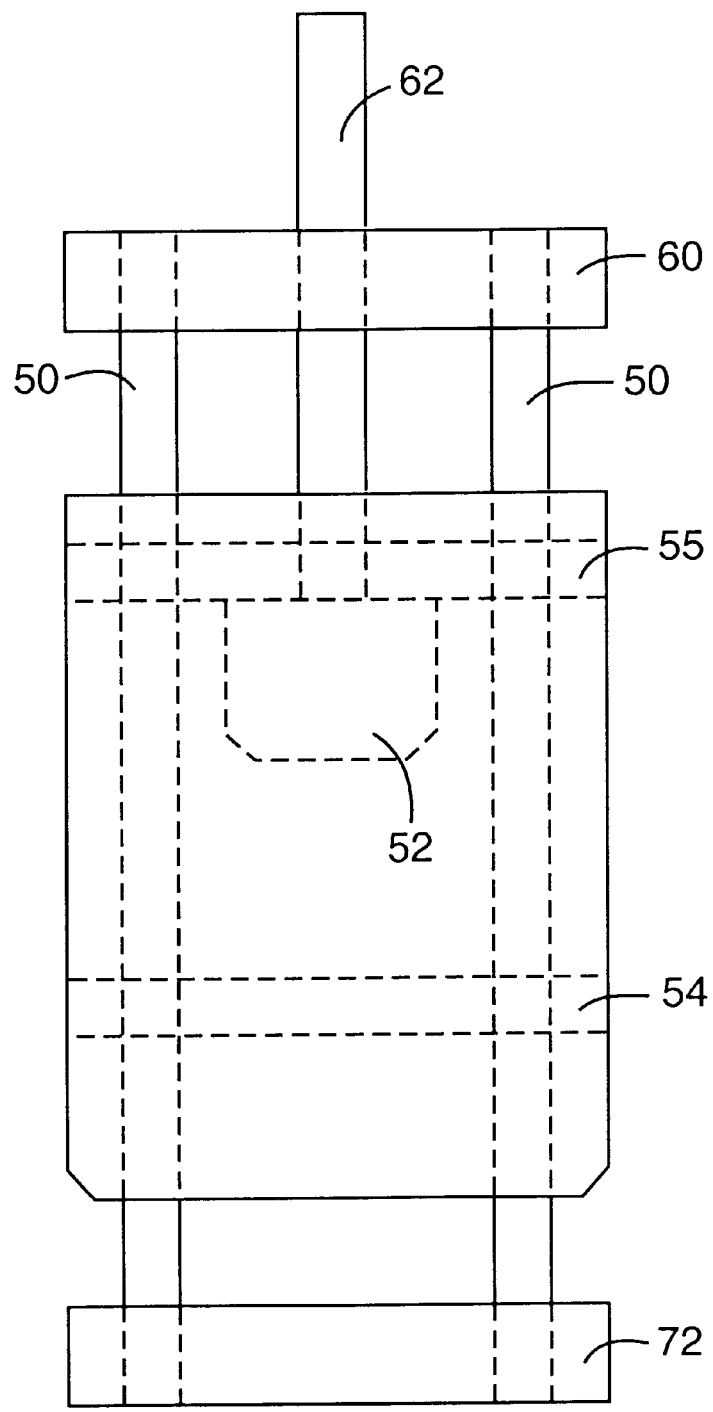

As best illustrated in FIG. 3b, an engraver housing 72 is mounted on a pair of rods 50, which are slidably engaged with the support members 54, 55. The rods 50 are joined at one end by an end plate 60. The end plate 60 is engaged with lead screw 62 that is connected to stepper motor 52 mounted on rear support member 55. The stepper motor 52 operates to turn lead screw 62, thereby moving end plate 60, attached rods 50, and engraver housing 72 in the Y-direction. This is the manner in which the engraving is performed, as well as the manner in which the shuttle is moved to transport a workpiece from the storage column.

Figure 4:
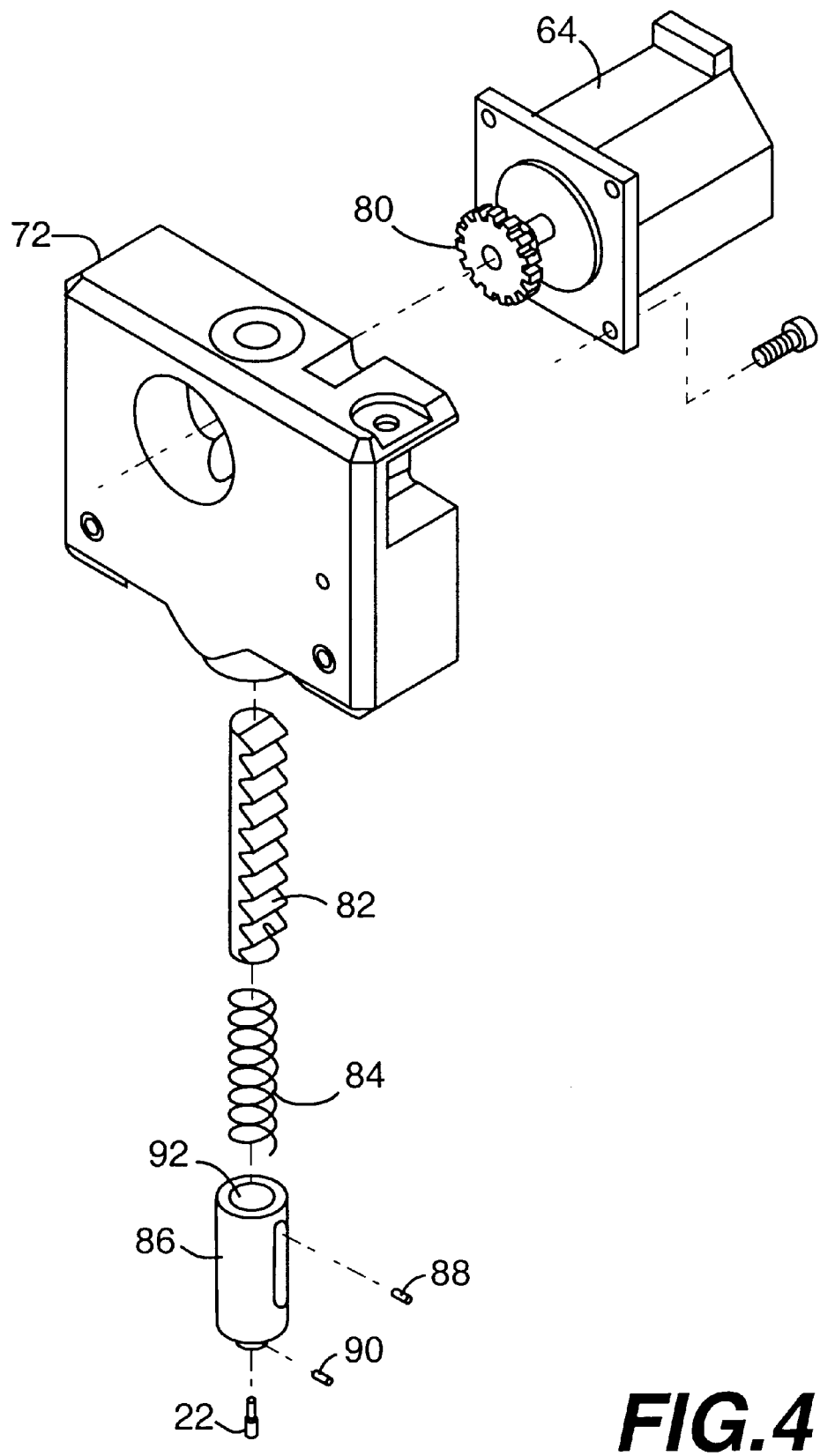
FIG. 4 is an exploded view of the rack and pinion of the present invention.

As best shown in FIG. 4, a stepper motor 64 turns a pinion 80 that is engaged with a rack 82 to move engraver 22 in the Z-direction. The rack 82 and pinion 80 are contained in engraver housing 72. A downward motion of rack 82 compresses spring 84 held within opening 92 in shaft 86. The rack is held within shaft 86 by a pin 88. The shaft 86 holds engraver 22 with a set screw 90. Thus, the pinion 80 operates to move rack 82, shaft 86, and engraver 22 in the Z-direction. This is the manner in which the engraver tip is brought into contact with the workpiece to engrave the workpiece and into engagement with the shuttle to move the shuttle.

In accordance with the present invention, the engraving apparatus includes a plurality of workpiece storage columns. Each of the storage columns is capable of storing a plurality of workpieces. The number of workpiece storage columns, as well as the capacity of each such column, can be selected to achieve the desired inventory and the desired number of workpiece options.

Figure 5:
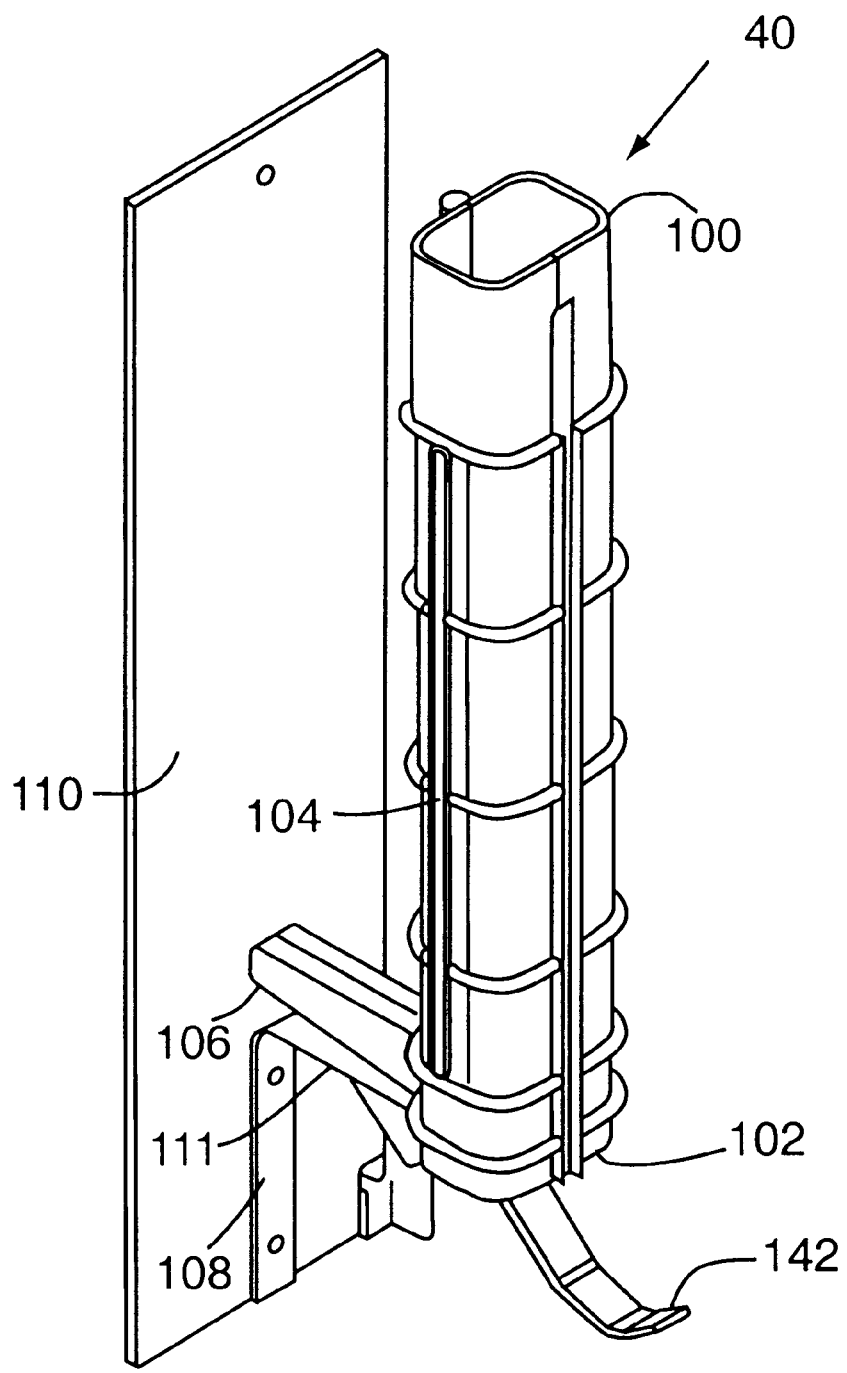
FIG. 5 is a pictorial view of the workpiece storage column and the guide member of the present invention.

As embodied herein and as best shown in FIG. 1 and FIG. 5, there are provided workpiece storage columns shown generally as 40. Each column 40 includes a top end 100 and a bottom end 102. Intermediate the top and bottom ends, a slot 104 is provided. A second slot (not shown) is provided on the opposite side of the column 40.

The workpiece storage columns are preferably made of a plastic material. The interior of the columns is an open cavity for storing a plurality of workpieces, stacked one on top of each other. The cavity within each column includes a cross-sectional shape configured to match the shape of a particular workpiece.

Figure 6:
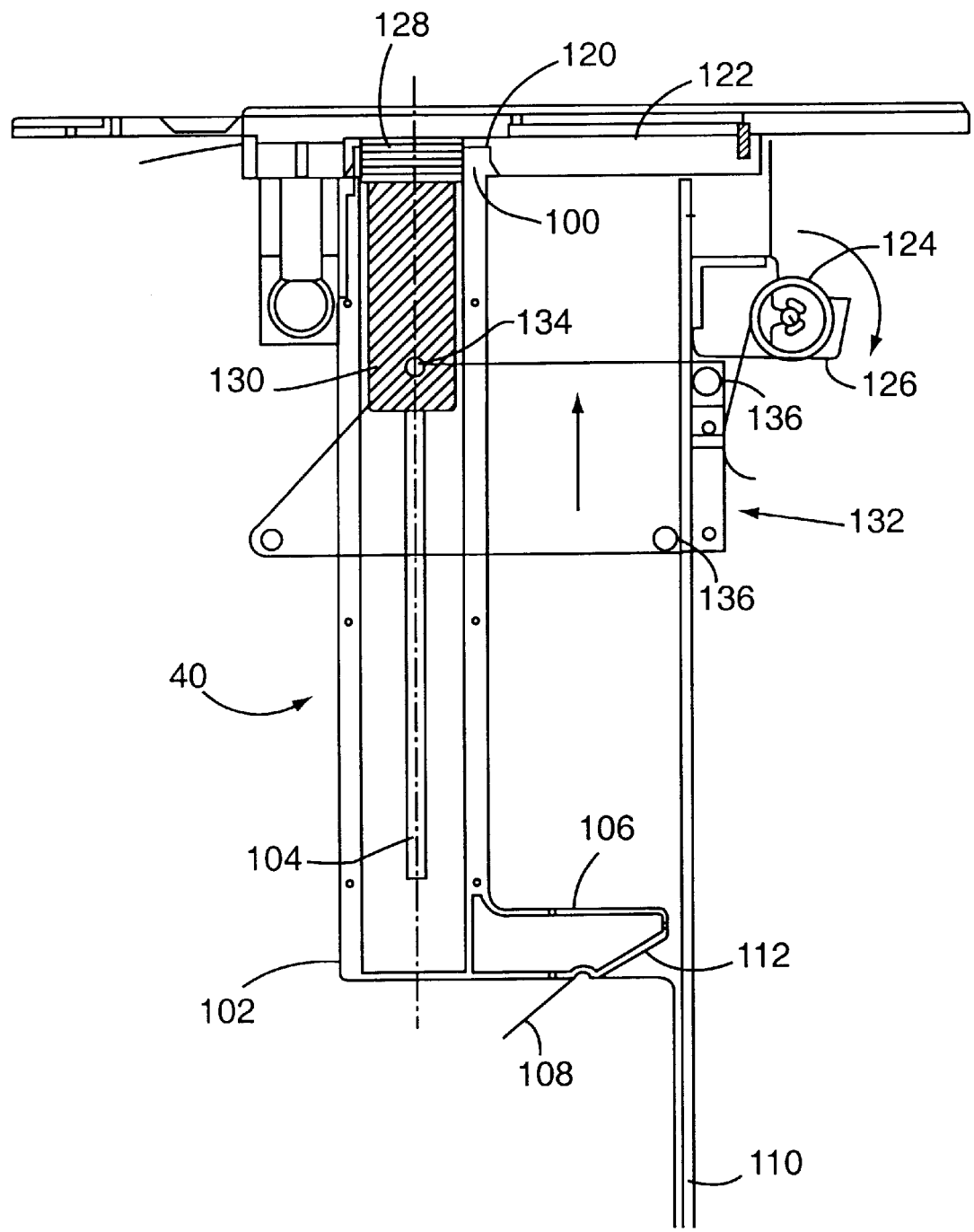
FIG. 6 is a side view of the workpiece storage column and spring loading mechanism of the present invention.

The workpiece storage column 40 has a boot shaped 106 lower end. The boot shape 106 has a groove 112 which engages a raised portion of an L-shaped support bracket 108. The support bracket 108 acts as a flexible support which provides support for the workpiece storage column 40. As shown in FIG. 6, the top end of the column 100 mates with a relief 120 in an anvil 122.

In accordance with the present invention, the engraving system includes a plurality of springs, one of the springs mounted externally to each of the storage columns. The spring exerts a force upon the plurality of workpieces in the storage column to thereby urge the workpieces toward one end of the column. Mounting the spring externally to the workpiece storage column, rather than inside the cavity of the column, increases the capacity within each column to store workpieces and allows for the easy interchange of the springs.

According to the present preferred embodiment, a positive gradient variable force spring is mounted externally to the workpiece storage columns as a biasing mechanism for the stored workpiece. This spring is designed to provide a constant force regardless of the number of workpieces in the storage column. As shown in FIG. 6, a spring 124 is coiled around pin 126, which is mounted rearwardly of each workpiece storage column. The spring 124 must be capable of exerting a force sufficient to move a full complement of workpieces 128 stored within a workpiece storage column. When different sized and weighted workpieces are placed in the storage columns, springs capable of exerting different forces are required. The external mounting of the spring allows for the easy exchange of springs.

Previous automated engraving machines provided for coiled, compression springs located within the storage column to exert an upward pressure on the workpieces. This approach leads to several problems. The location and length of the compression springs take up more space than necessary. Also, the compression springs complicate the exchange of storage columns when a new storage column holding a different shape and size of workpiece is required. And, to restock a storage column with additional workpieces, the compression spring must be retracted and held with a separate part, thus making it difficult to restock the columns.

According to the presently preferred embodiment, the spring 124 exerts its biasing force through a slide assembly mounted externally to the workpiece storage columns and a lift plug provided within each such column. As shown in FIG. 6, lift plug 130 is positioned within storage column 40. The lift plug 130 supports the stack of blank workpieces 128. The lift plug 134 is operably connected to slide assembly 132 by rod 134. The rod 134 transverses storage column 40 through slots 104 disposed on opposite sides of the storage column 40. The slide assembly 132 is connected to spring 124 which operates to exert an upward force on slide assembly 132.

The motion of slide assembly 132 is guided by rollers 136 and guide member 110. There are rollers 136 on either side of guide member 110 to ensure that slide assembly 132 moves in a vertical direction. Thus, the upward biasing of spring 124 is transferred through slide assembly 132 and lift plug 130 to workpieces 128 stored in storage column 40.

Figure 7:
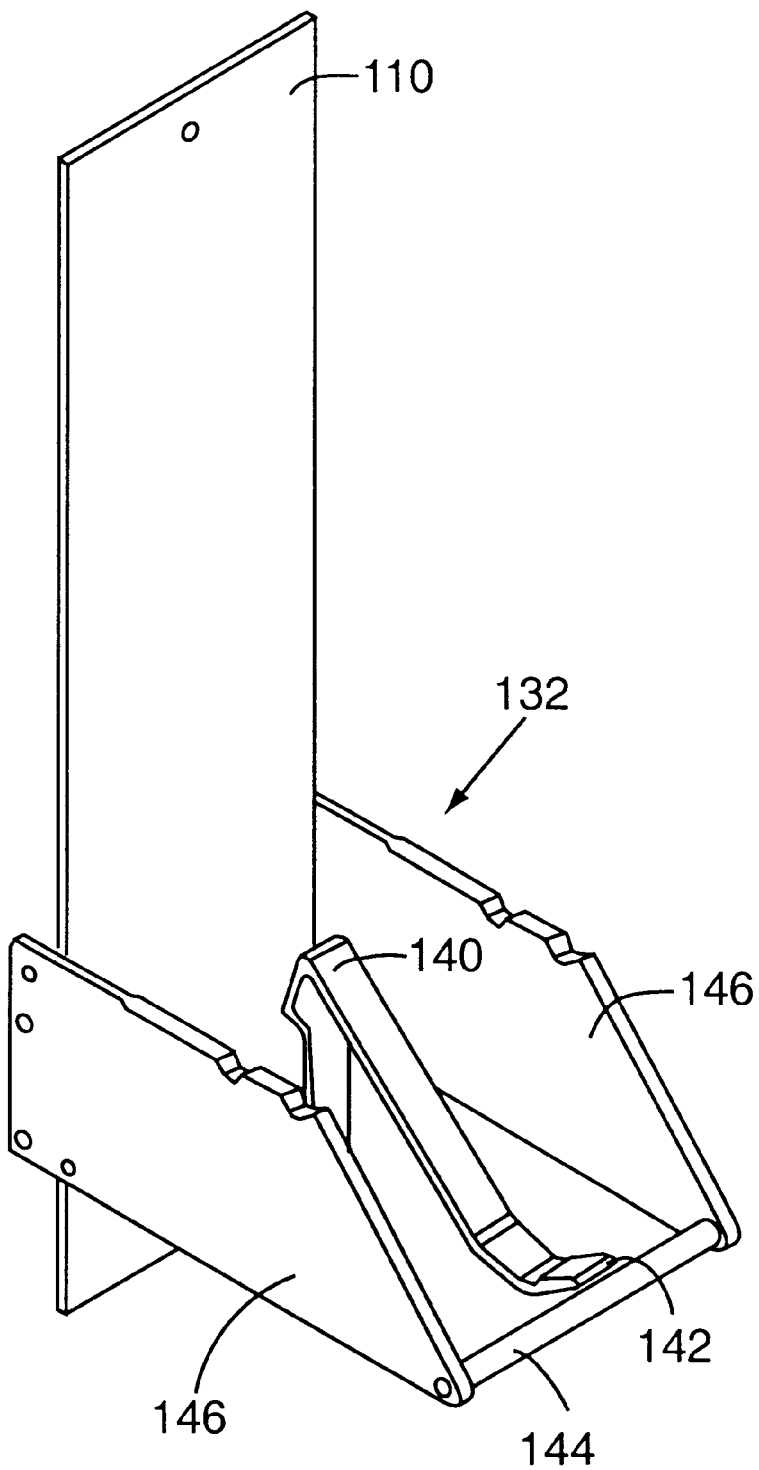
FIG. 7 is a pictorial view of the lift plug cradle with handle and locking device of the present invention.
Figure 8:
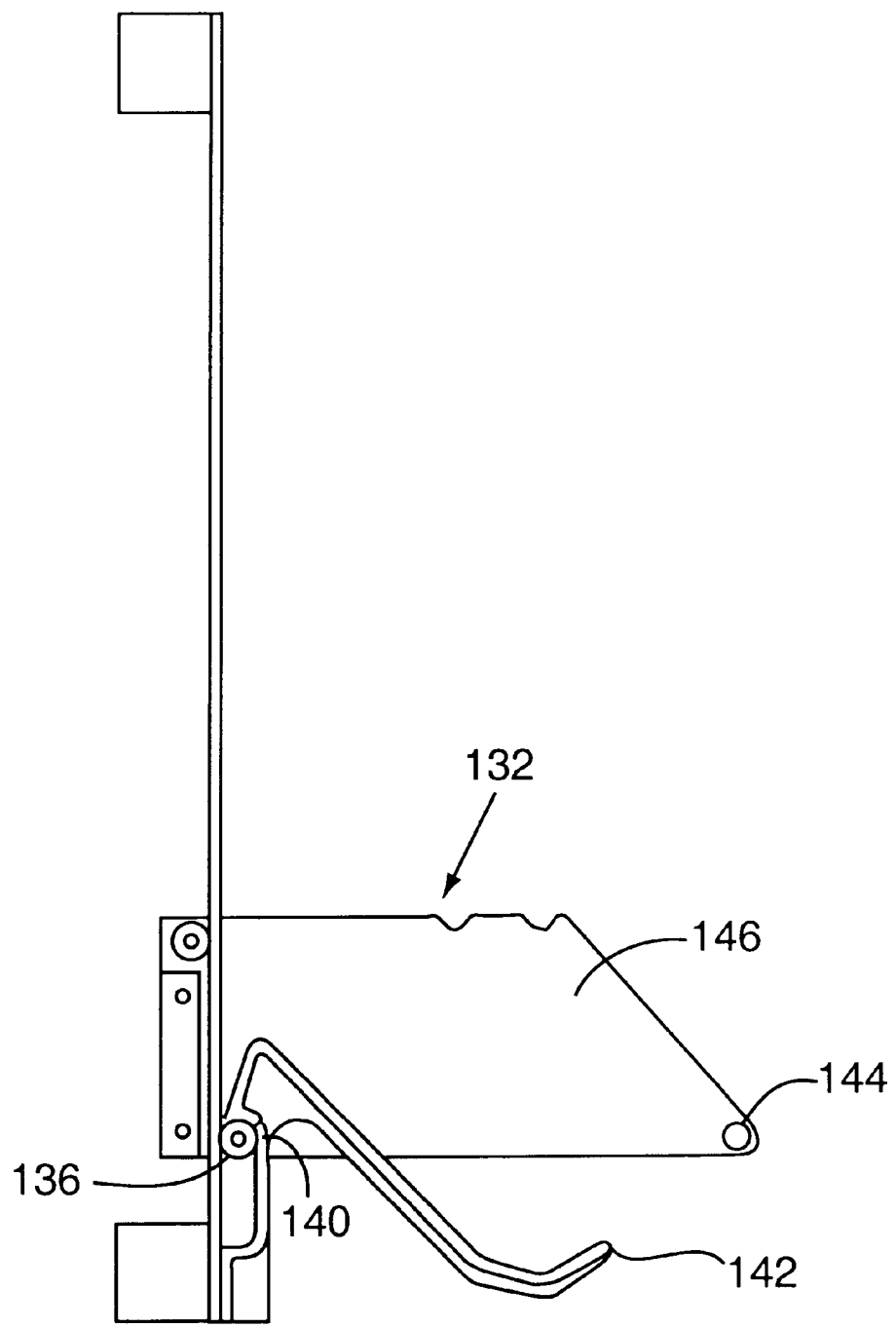
FIG. 8 is a side cross sectional view of FIG. 7.

The present invention provides for the easy restocking of the storage columns. As illustrated in FIG. 7, the slide assembly 132 has a handle 144 that connects the slide assembly walls 146. A catch 140 is mounted on guide member 110 between slide assembly walls 146. As best shown in FIG. 8, when the slide assembly is in its lowest position the lower roller 136 engages catch 140 thereby holding slide assembly 132 in place. With the slide assembly locked in its lowest position, the storage column can be removed by pulling storage column 40 down and away from anvil 122. In this manner, the workpiece storage columns may be quickly and easily interchanged. The slide assembly 132 may be released by pressing down on the end of catch 142.

An alternative embodiment of the present invention would provide for an inverted machine, wherein the workpiece storage columns are located above the shuttles. With this arrangement, it would be possible to omit the spring assembly and to utilize gravity to move the workpieces from the storage column to a desired shuttle.

In accordance with the present invention, the engraving system includes an anvil having a plurality of bores. In the presently preferred embodiment a series of anvils are provided, one for each workpiece storage column. As embodied herein and best shown in FIG. 9, the anvil 122 extends laterally within the engraving apparatus adjacent the top end 100 of each workpiece storage column 40. The anvil 122 rest on supports 156.

Each anvil 122 has two bores 150, 152 corresponding to the workpiece storage column 40. The loading bore 152 has substantially the same shape as the workpiece held in the adjacent workpiece storage column 40. The loading bore 152 defines the loading location. The clamping bore 150 preferably has a generally circular shape and defines the engraving location.

An anvil in accordance with the present invention may perform one or more of the functions of being a support surface for the workpiece, a sliding surface that acts to guide the shuttle, providing a support structure to which other elements (such as the storage columns) are attached, and determining the positions of the pistons. Although multiple anvils are utilized in the present preferred embodiment, it is contemplated that a single elongated anvil may also be used.

In accordance with the present invention, the engraving system includes a plurality of shuttles to move the workpieces from the storage column (loading location) to an engraving location. The shuttles are situated adjacent the anvil and constitute a movable plate configured to receive a workpiece from a storage column and transport the workpiece to its desired location within the apparatus. In the preferred embodiment, the engraver engages an opening or a groove in the shuttle to move the shuttle between the loading location, the engraving location, and a dispensing location. In this manner, a separate motor to move each of the shuttles is not necessary.

Figure 9:
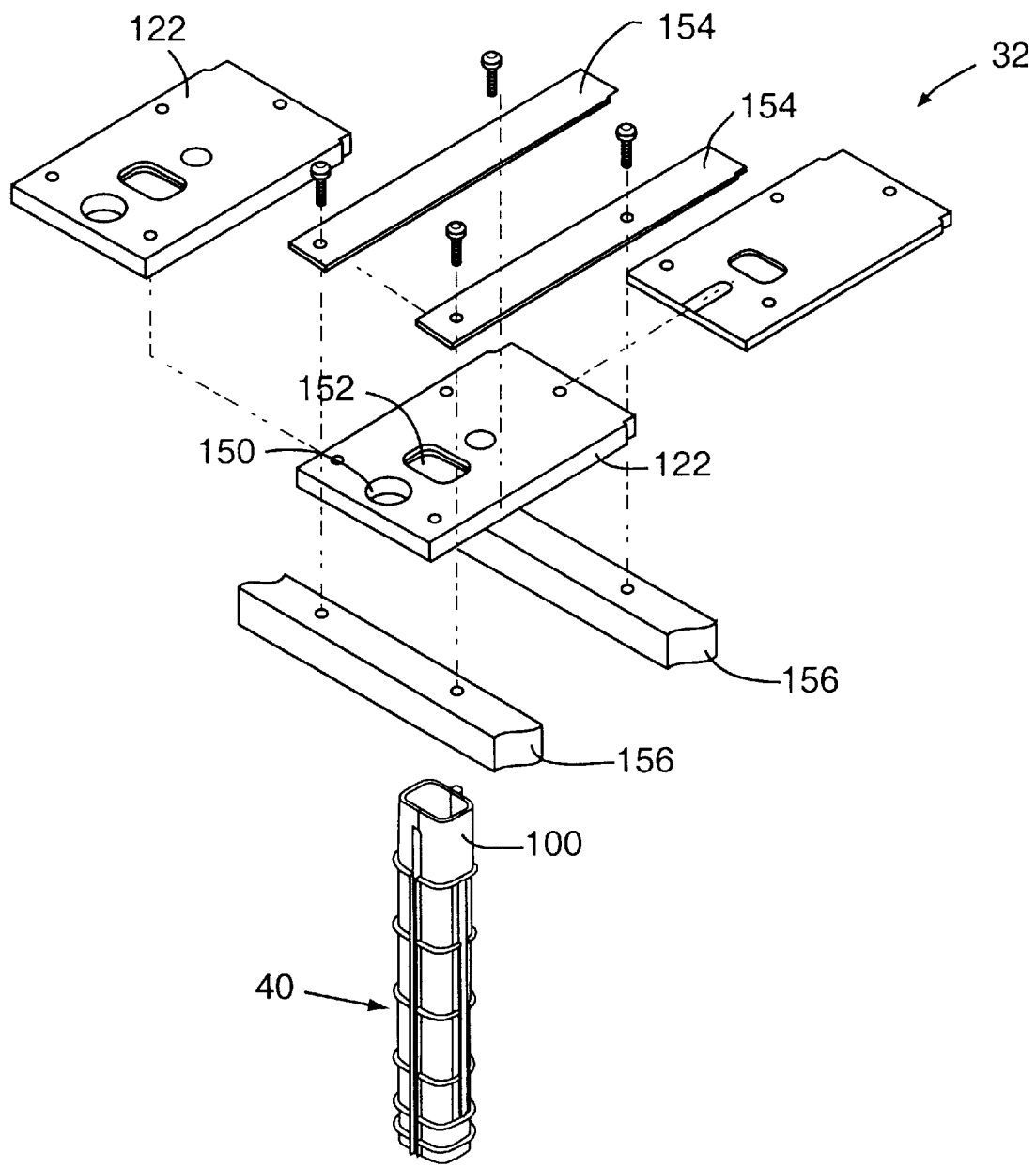
FIG. 9 is an exploded view of the anvil assembly and workpiece storage column.
Figure 10A:
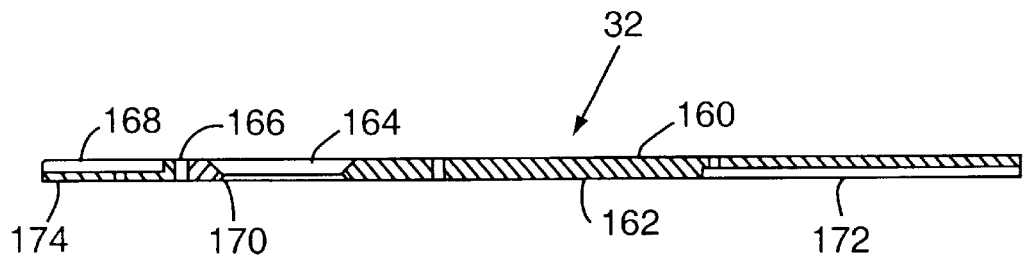
FIG. 10a is a side cross sectional view taken along the centerline of a shuttle of the present invention.
Figure 10B:
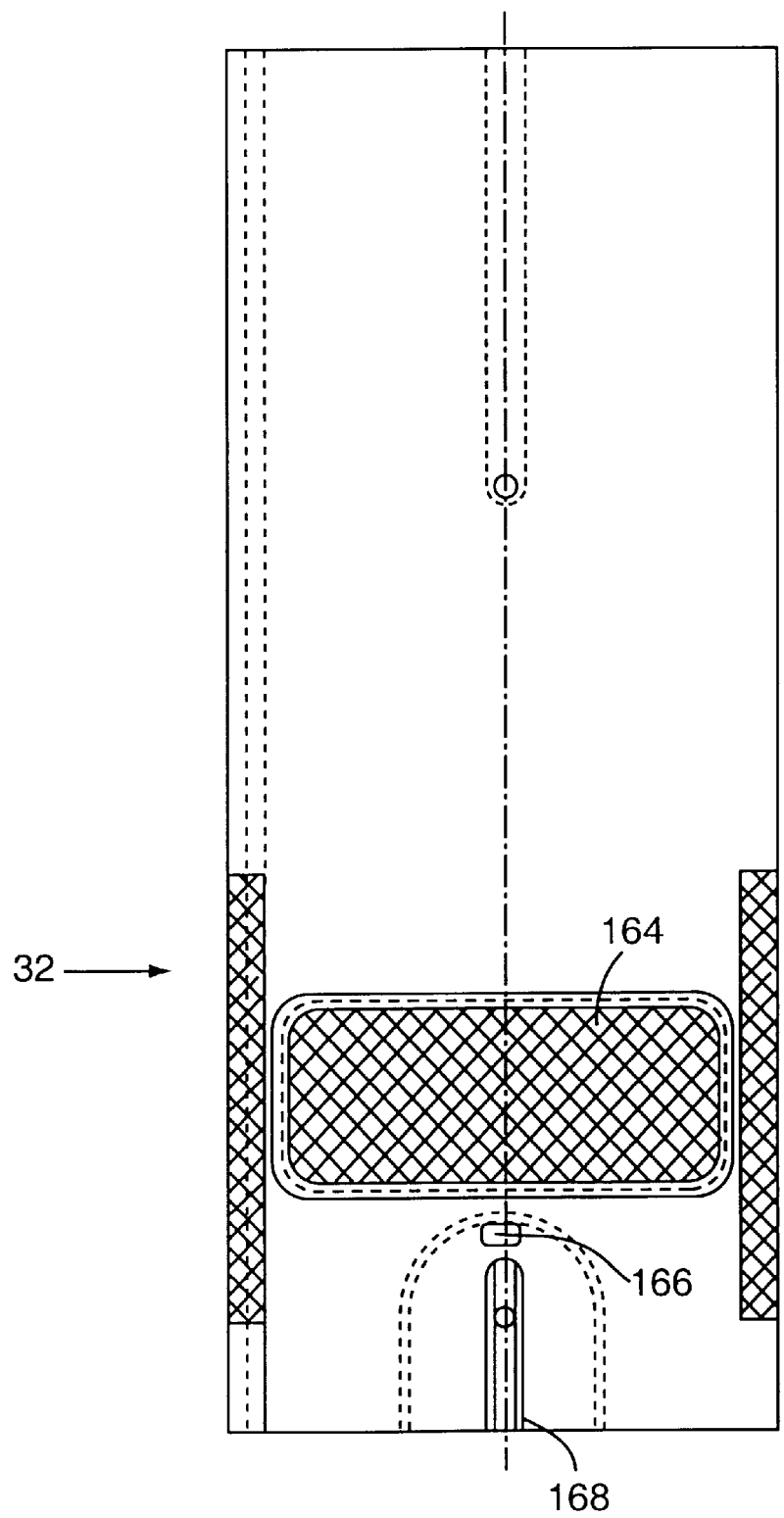
FIG. 10b is a top view of the shuttle.
Figure 10C:
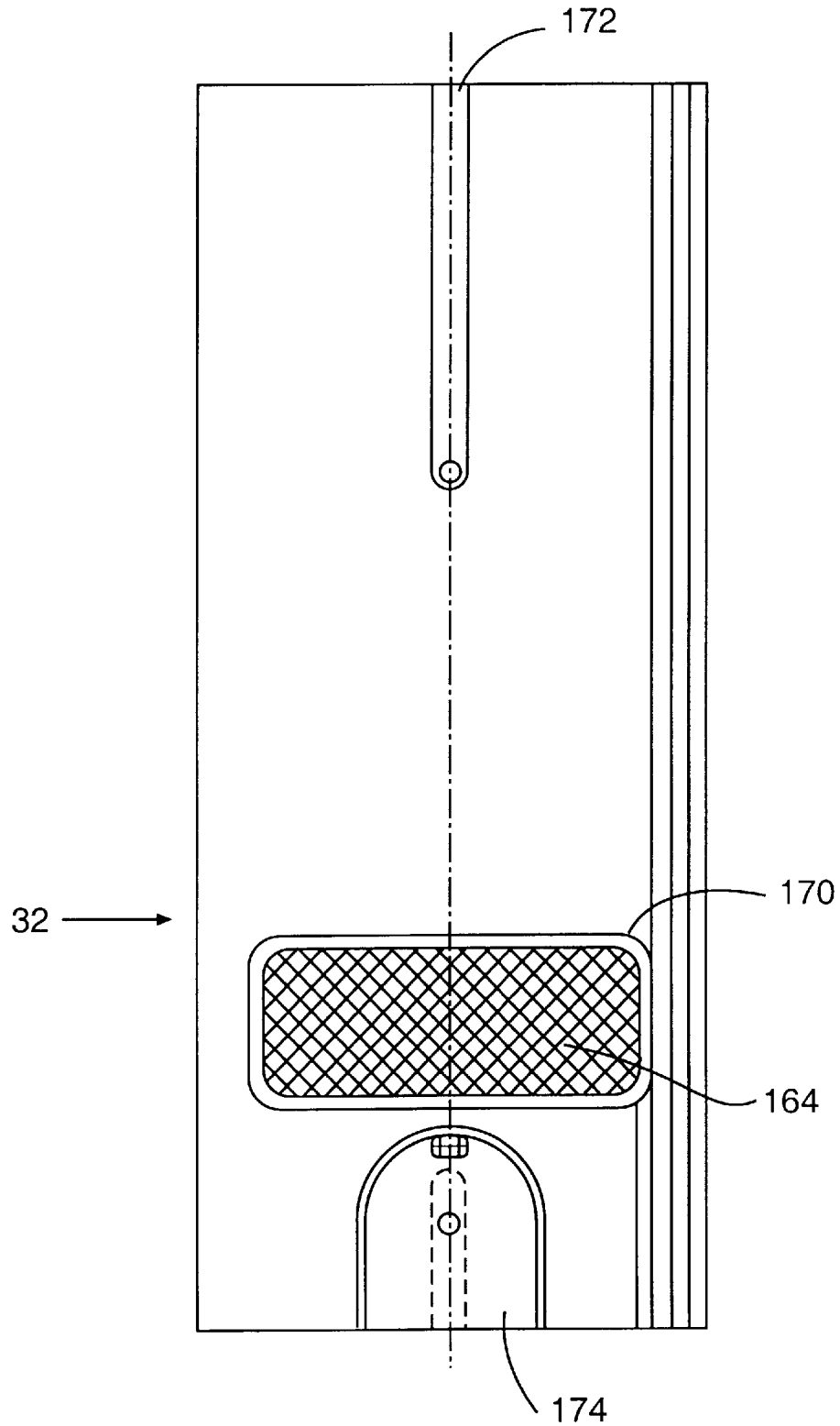
FIG. 10c is a bottom view of the shuttle.
Figure 11:
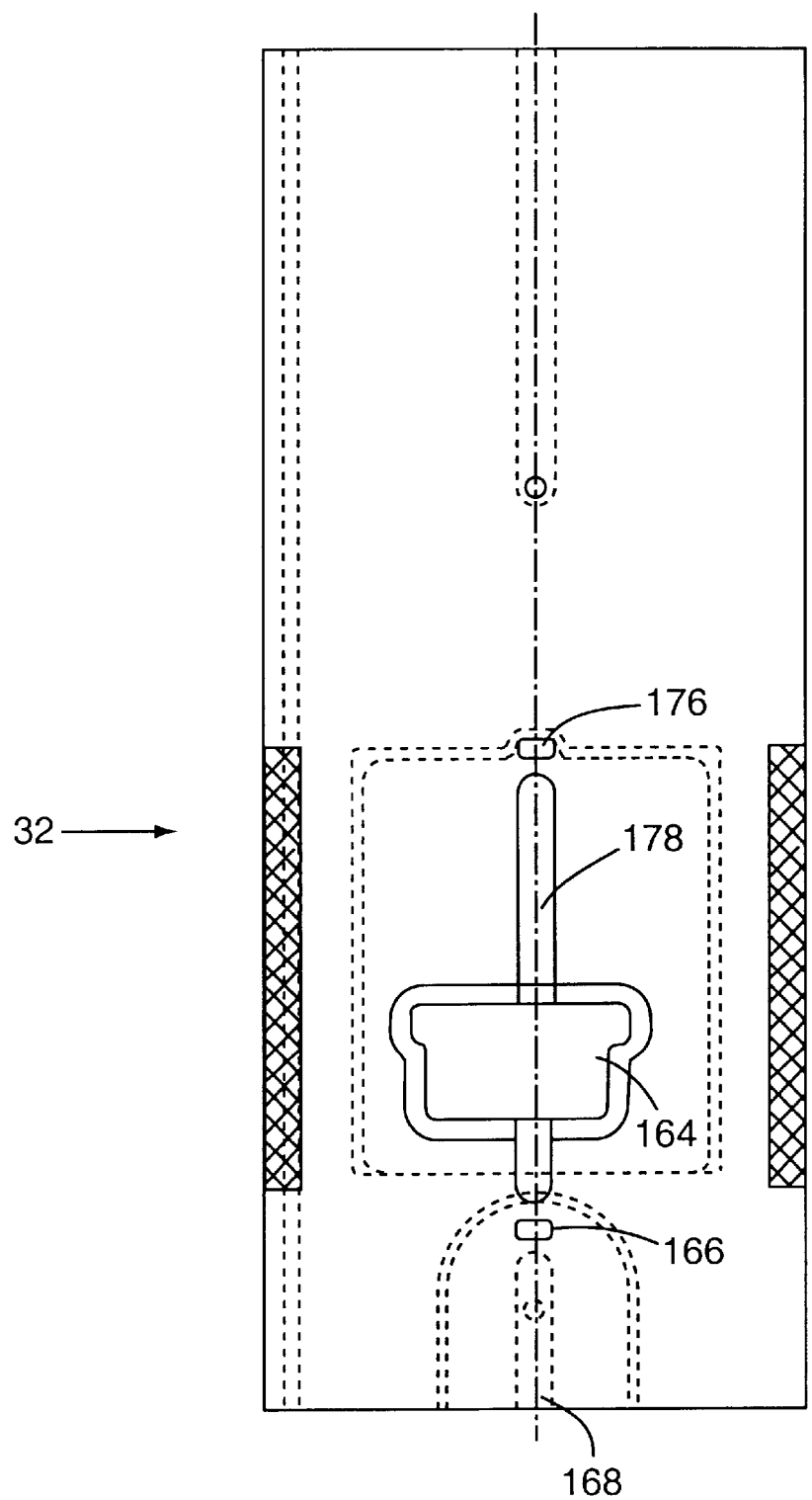
FIG. 11 is a top view of an alternate embodiment of the shuttle.

As embodied herein and as best illustrated in FIGS. 10a, 10b, and 10c, shuttle 32 has a top side 160, a bottom side 162, and an open bore 164. On the top side 160, the shuttle has an opening 166 and a groove 168. On the bottom side 162, the shuttle 32 has a recess 170 surrounding open bore 164, a guide groove 172, and a relief 174. The recess 170 surrounding the open bore has substantially the same shape as the workpiece held therein. As shown in FIG. 11, another embodiment of the shuttle may also have a second opening 176 and a second groove 178 for the engraver to engage and move the shuttle 32. As can be seen in FIG. 9, shuttle 32 slides between retainer members 154 over anvil 122.

In accordance with the present invention, the engraving system includes a means for selectively clamping a workpiece during an engraving operation. The selective clamping means is operable between a clamping position in which the workpiece is clamped within an opening in the shuttle and a released position in which the clamping means does not contact the shuttle or a workpiece within the opening in the shuttle. As embodied herein, the selective clamping means includes at least one piston and a cam operable to move the piston between the clamping position and the released position. Alternative embodiments of the selective clamping means could include hydraulics, pneumatics, or individual motors.

Figure 12:
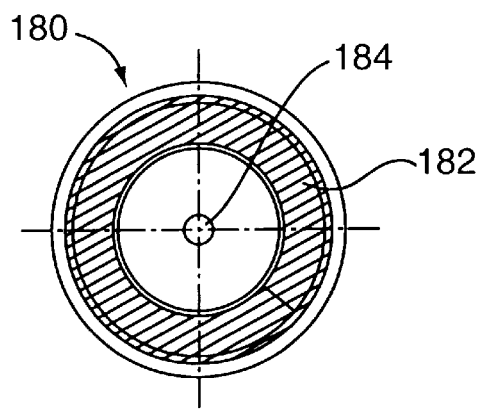
FIG. 12 is a top view of a piston clamp of the present invention.
Figure 13:
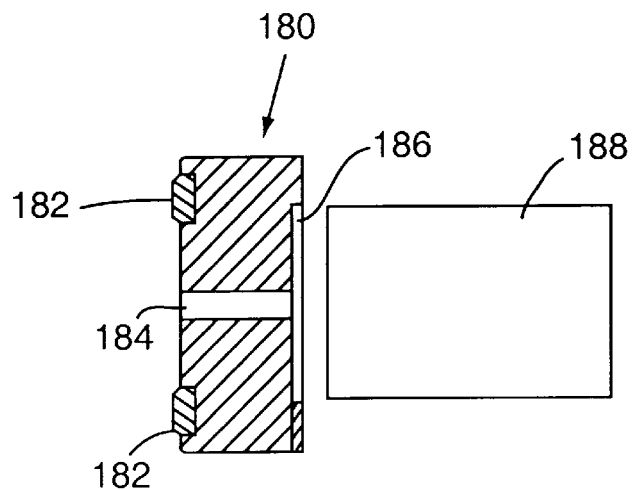
FIG. 13 is an exploded cross sectional view of a piston clamp and lift pin of the present invention.

The presently preferred embodiment of the invention includes a piston/cam arrangement, with a piston aligned with each clamping bore 150 in the anvil 122. The head of the piston is positioned within the clamping bore 150 and is moved by the cam into contact with a workpiece. As best shown in FIGS. 12 and 13, the piston head 180 has a raised surface 182. The raised surface 182, which contacts the workpiece during the engraving process, is preferably made of rubber, although alternative materials will be readily apparent to those skilled in the art. It is further preferable to provide an open bore 184 within each piston head to prevent a vacuum from forming when the raised surface 182 of the piston head 180 is compressed against the workpiece.

As shown in FIG. 13, the piston head also has a relief 186 which engages the piston lift stem 188. The relief in the piston heads ensures a flat surface for the stems to contact.

To provide adjustment for the stack up of tolerances created by a multi-part assembly, the present invention provides stems 188 of varying length. This ensures that the force required to clamp a workpiece remains generally constant.

The cam and pistons provide a means to clamp a workpiece against the shuttle. The cam is operable to move the pistons so that when a shuttle has positioned a workpiece over the clamping bore in the anvil, the workpiece will be clamped against the shuttle by one of the pistons. Preferably, all pistons are moved together. The relief provided in the bottom surface of each shuttle allows for all pistons to be raised without exerting any force on the shuttles, with the exception that the piston associated with a shuttle holding a workpiece to be engraved will exert an upward force on the workpiece held in the shuttle relief, thus allowing for one controller, one motor, and one cam.

Figure 14:
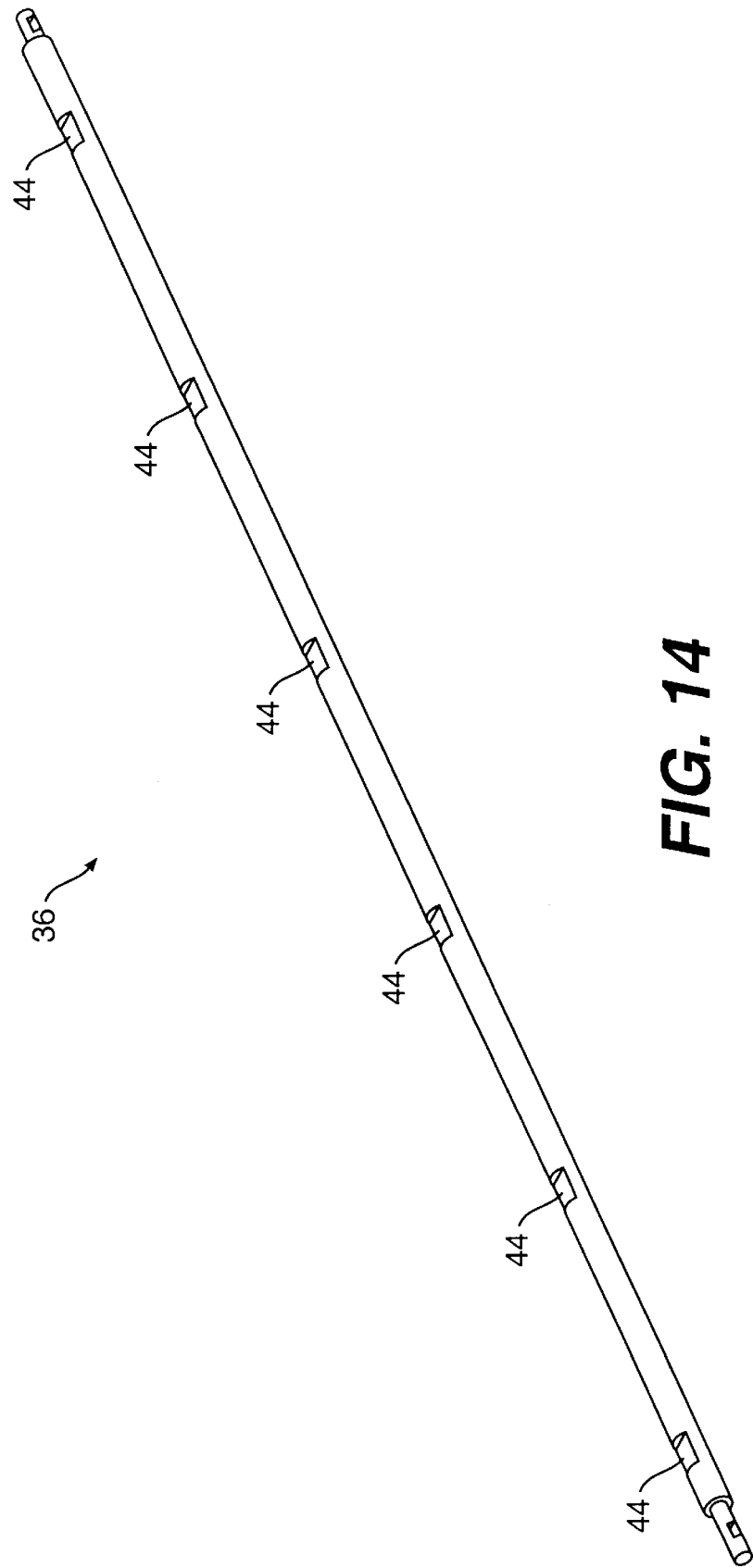
FIG. 14 is a pictorial view of a piston clamp actuation cam of the present invention.

As embodied herein and as best shown in FIG. 14, the cam 36 is comprised of an elongated rod having a series of flat portions 44. Each flat portion 44 is positioned beneath a piston stem such that the rotation of the rod will cause the piston heads to move. Alternatively, the cam 36 may comprise an elongated rod having D-shaped cross section.

All of the stepper motors in the engraving apparatus are controlled by a central control system. This control system is used to receive the users input and control all of the functions of the engraving process. The engraving apparatus is equipped with means by which a user can select a certain workpiece from a variety of differently shaped workpieces and also select the design or message to be engraved on the chosen workpiece. Any of a number of means to perform this function will be readily apparent to those skilled in the art. In the preferred embodiment, a front-end software system driven by a touch-sensitive screen is used to accept the user's input and control the movements of the engraving machine. The user first selects a workpiece from the number of differently shaped workpieces to engrave and then inputs the characters and/or design to be engraved on the workpiece. The software system then coordinates the movements of the engraving machine to engrave the workpiece as desired by the user.

Figure 15A:
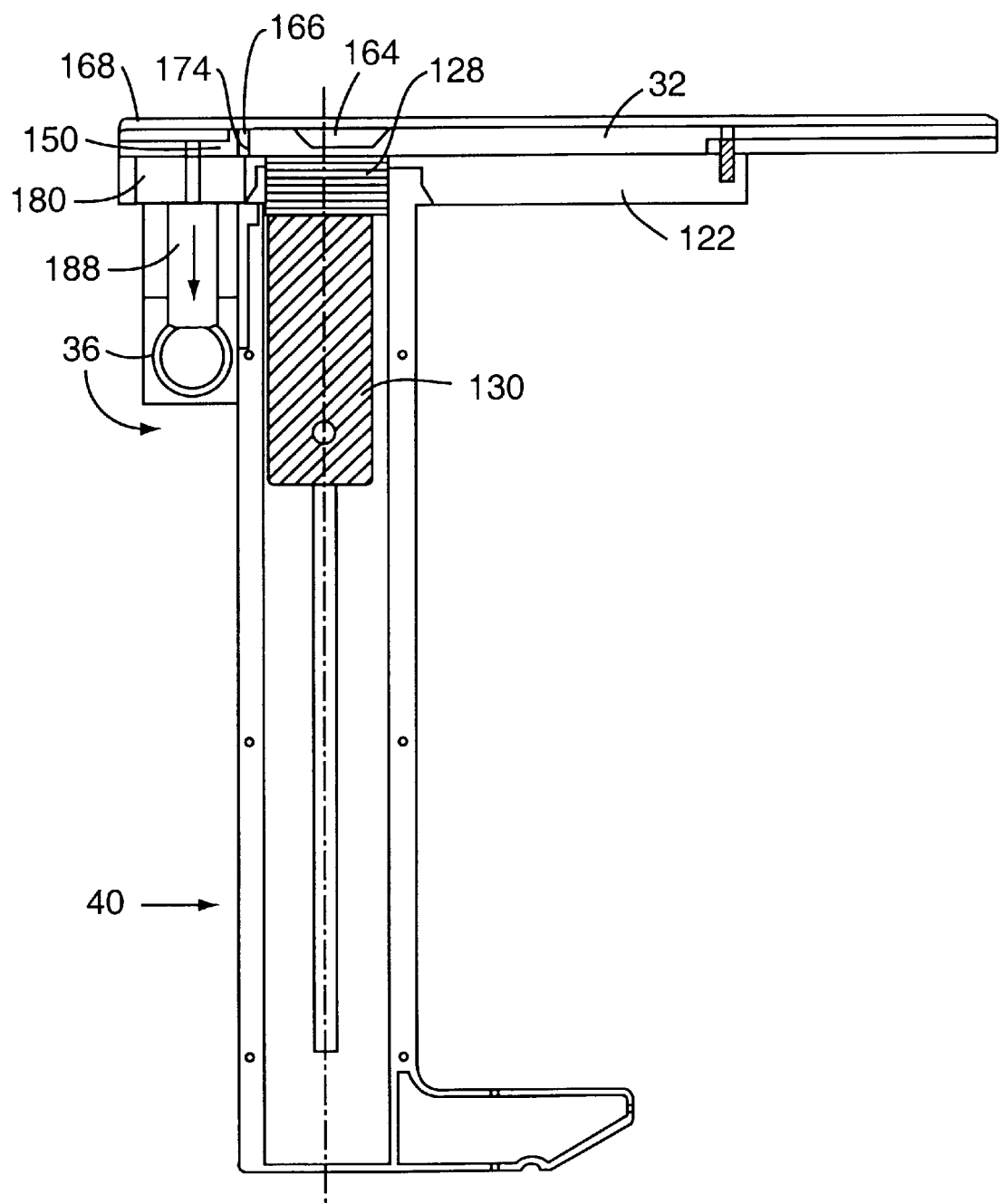
FIG. 15a is a side cross sectional view of a portion of the engraving machine, illustrating the workpiece loading position of the shuttle.

The operation of the engraving apparatus of the present invention will now be described with reference to the accompanying drawings. As illustrated in FIG. 1, the control system operates the X-direction stepper motor 30 to move the engraver 22 to a position corresponding to the storage column 40 storing the selected shape of workpiece. Because of the possibility that the shuttle is not in the full rearward position, which corresponds to the loading location as illustrated in FIG. 15*a*, the engraver is automatically extended in the Y-direction to the full forward, dispensing position of the shuttle, lowered to the level of the groove 168 (referring to FIG. 10*b*), and retracted. If the shuttle 32 is not in the loading position, the engraver 22 will engage the groove 168 and return the shuttle 32 to the loading location. If the shuttle 32 did not have the groove 168 and the engraver was lowered when the shuttle 32 was not positioned properly, the tip of the engraver could contact the shuttle and damage the engraver. This process ensures that the operation begins with the shuttle in the correct, loading position.

When the shuttle 32 is moved so the open bore 164 is over the storage column 40, a void is created by the recess 170 (see FIG. 10*a*) in the shuttle 32. The upward bias of the spring 124 (referring to FIG. 6) urges the next workpiece into the recess 170 of the shuttle. The depth of the recess 170 is sized so that only one workpiece 128 may fit into the recess at a time. The engraver then lowers in the Z-direction to engage the opening 166 in the shuttle and move the shuttle with the workpiece in the Y-direction to the engraving location over clamping bore 150 of anvil 122. By using the engraver to move the shuttle, the present invention obviates the need of the previous automated engraving machines to have a separate stepper motor move the shuttle. Removing this motor reduces the complexity of the machine and makes the machine easier to construct.

Figure 15B:
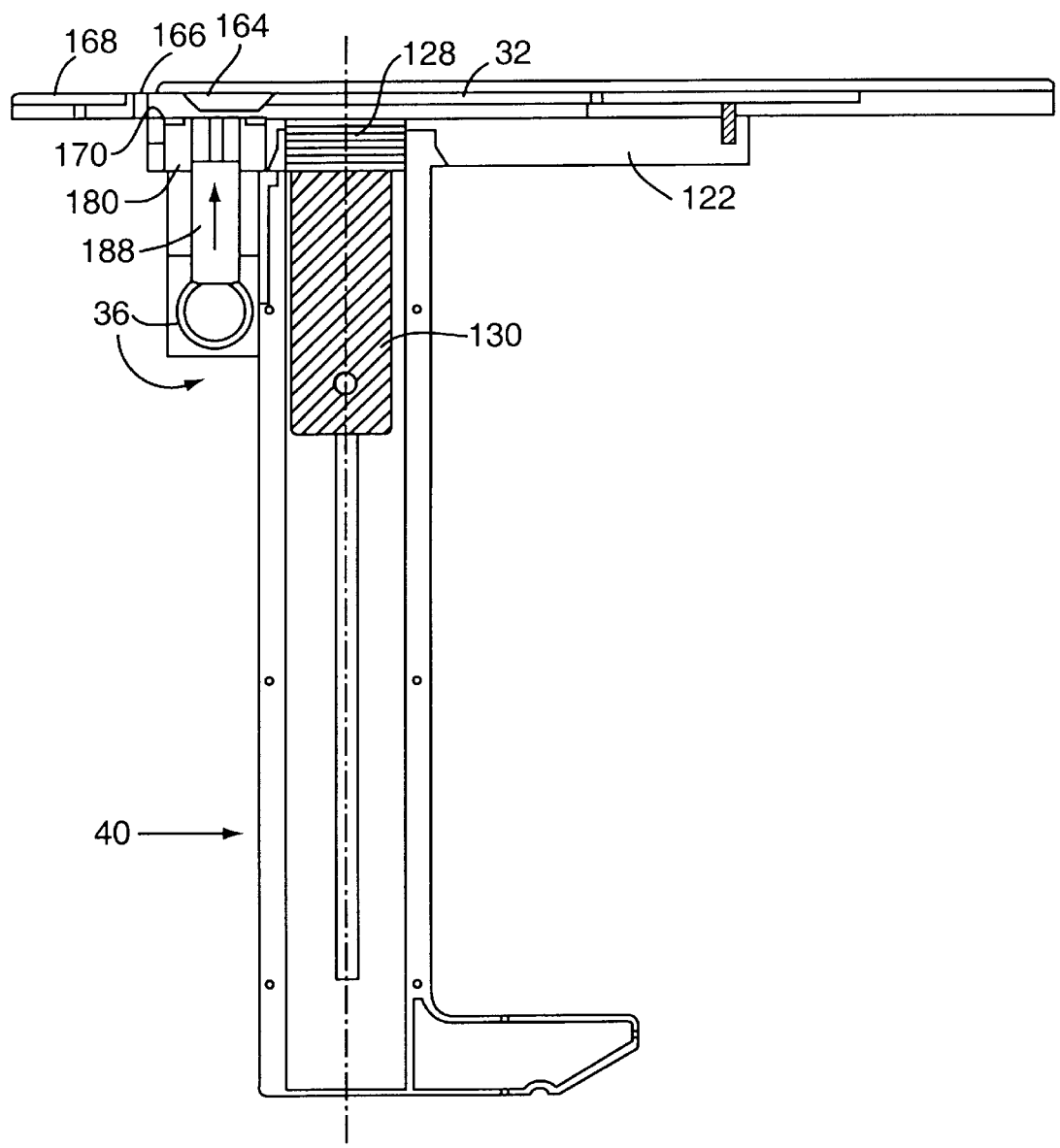
FIG. 15b is a side cross sectional view of a portion of the engraving machine, illustrating a workpiece in the engraving position.

Once the workpiece has been moved to the engraving position, as illustrated in FIG. 15*b*, the control system causes a motor 46 (referring to FIG. 1) to operate the cam 36 to raise the pistons. The piston head 180 contacts the workpiece and clamps the workpiece against the recess 170 in the shuttle 32. The piston head is equipped with a ring made from a cushioning material that will contact the workpiece. This ring, which could be made of rubber or another similar material, will protect the workpiece from being scratched by the piston while it is being clamped. To prevent a vacuum from being created between the cushioning ring and the workpiece, the invention provides an open bore 184 through the piston head 180 (referring to FIG. 13).

When the workpiece is moved over the clamping bore 150, the pistons rest on the flat portion of the D-shaped cam 36. The rotation of the cam causes the pistons to move upwardly as the contact between the piston stem 188 and the cam 36 shifts from the flat portion of the D-shape to the rounded portion of the D-shape. The amount of movement of the piston can be changed by modifying the D-shape of the cam. Alternatively, and as illustrated in FIG. 14, the cam 36 may comprise an elongated rod of generally circular cross section and have a series of flat portions 44 cut into the rod, such that underneath each piston is a section having a generally D-shaped cross section.

As shown in FIG. 15*a* and FIGS. 10*a* and 10*c*, the shuttles 32 have a relief 174 on the bottom side of the shuttle. The relief 174 is positioned such that when the shuttle is in its rearward position, the relief 174 is over the clamping bore 150. Since the cam 36 operates to move all of the pistons at the same time, the relief 174 in the shuttle affords an open area into which the pistons may move. Thus, those pistons moving up where there is no workpiece do not make contact with the shuttle. This is beneficial in that a smaller motor may be used to operate the cam 36 as the force required to move the pistons is reduced.

Figure 15C:
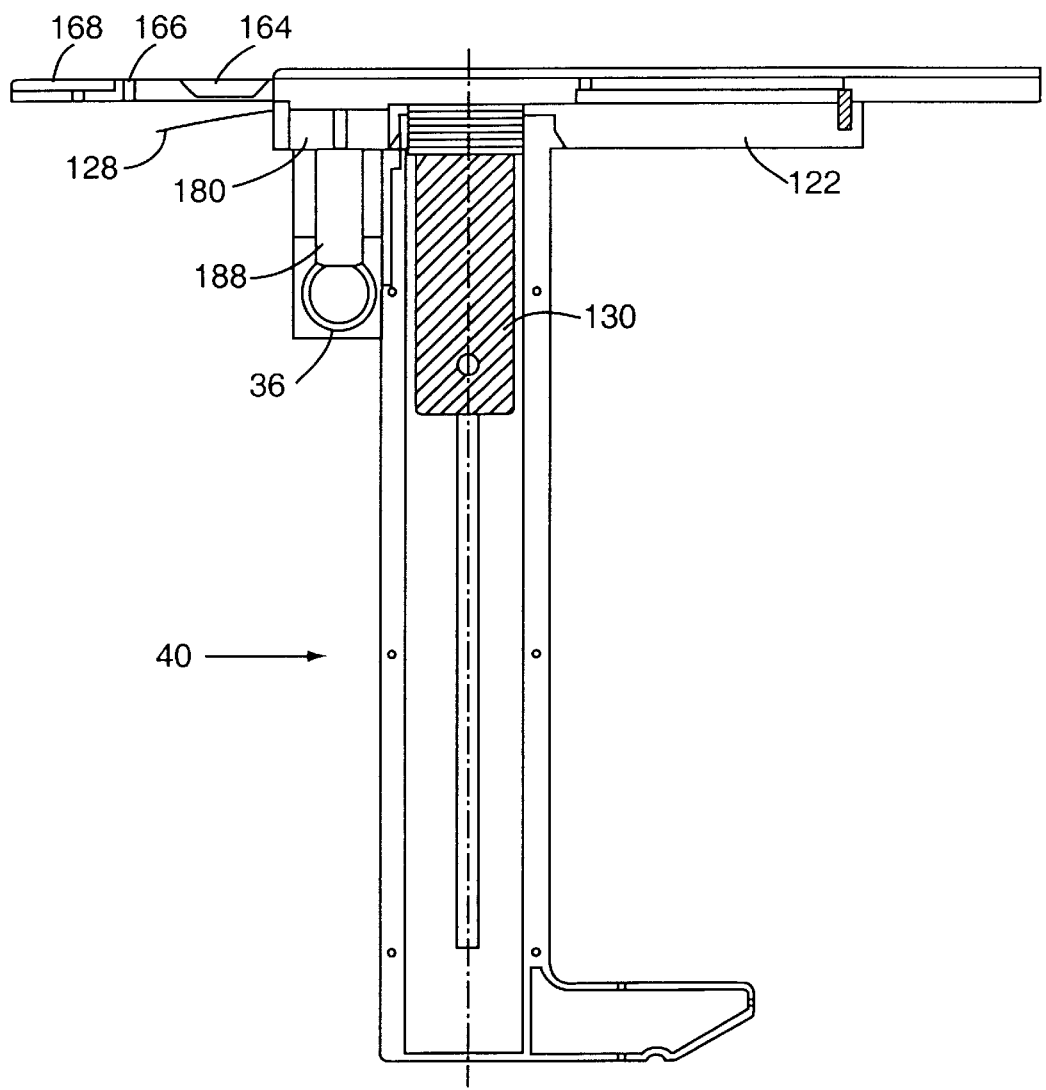
FIG. 15c is a side cross sectional view of a portion of the engraving machine, illustrating a workpiece being dispensed after engraving.

When the workpiece is clamped against the shuttle 32, the control system moves the engraver to engrave the message selected by the user into the workpiece. Once the engraving is finished, the engraver again engages the opening 166 in the shuttle and moves the shuttle to a dispensing location. As FIG. 15*c* illustrates, at the dispensing location, the shuttle is moved past the end of the anvil, so that gravity acts on the workpiece 128 to cause it to fall from the shuttle. As a precaution, the system may be designed so that the engraving tip is poked through the engraving opening to ensure the workpiece falls out.

After the workpiece 128 is dispensed from the shuttle, the engraver preferably engages the groove 168 of the shuttle and retracts the shuttle to the loading position. When the shuttle has been fully retracted, the engraving operation is complete and the control system awaits the next instruction to engrave another workpiece.

A second embodiment will now be described where like or similar parts are identified throughout the drawings by the same reference characters.

In this embodiment and as illustrated in FIG. 11, the shuttle has an additional opening 176 and an additional groove 178. The engraver engages the first opening 166 to move the shuttle 32 from the storage location to the engraving location and the second opening 176 to move the shuttle from the engraving location to the dispensing location. Similarly, the engraver engages the second groove 178 to move the shuttle from the dispensing location to the engraving location and the first groove 168 to move the shuttle from the engraving location to the storage location. This configuration allows for a shorter Y-direction lead screw 62 (referring to FIG. 3b) since the engraver can use the same range of motion to move the shuttle between the storage location and the engraving location as it does to move the shuttle between the engraving location and the dispensing location. By using a shorter lead screw 62, the overall depth of the engraving apparatus is reduced. Since the depth of the machine limits the locations where the machine may be placed, reducing the depth increases the locations within a store where the machine can be located.

As best shown in FIG. 6, the workpieces 128 are stacked within the storage column 40 vertically. The workpieces must be stored such that they can be retrieved with a consistent alignment so the engraving will be correctly oriented on the workpiece. To accomplish this, the storage columns 40 must have substantially the same shape as the workpieces which it holds. The close fit of the workpieces inside the storage column ensures that each of the workpieces will be aligned so that no additional positioning is required to align the workpiece for engraving. Accordingly, there must also be at least one storage column for each of the differently shaped workpieces available to the user. Although, depending on the demand for a certain shape of workpiece, several storage columns may be devoted to a particular shape of workpiece.

The loading bore 152 in the anvil and the recess 170 around the open bore 164 of the shuttle 32 must also have substantially the same shape as the workpiece to be engraved to maintain the orientation of the workpiece as it leaves the storage column. Thus, the shape of the workpiece determines the shape of the storage column 40, the shape of the loading bore 152, and the shape of the recess 110 in the shuttle.

It will be apparent to those skilled in the art that various modifications and variations can be made in the construction of this engraving apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An engraving apparatus, comprising:
   a plurality of workpiece storage columns, each of the storage columns capable of storing a plurality of blank workpieces;
   an anvil having a plurality of bores;
   a plurality of shuttles, one of the shuttles operable to move one of the workpieces from one of the storage columns to a corresponding bore in the anvil; and
   at least one piston configured to fit through one of the bores in the anvil to clamp the one workpiece against the corresponding shuttle.

2. The engraving apparatus of claim 1, further comprising an engraver, the engraver being movable into engagement with a shuttle having a selected workpiece to move the workpiece to a corresponding bore.

3. The engraving apparatus of claim 1, wherein the at least one piston includes a head sized to fit through one of the bores in the anvil.

4. The engraving apparatus of claim 1, further comprising a cam operable to move the at least one piston to clamp the workpiece against the corresponding shuttle.

5. The engraving apparatus of claim 4, wherein the cam comprises an elongated rod having a substantially D-shaped cross section, the rod being positioned such that when the rod is rotated the D-shape of the rod operates to move the pistons.

6. The engraving apparatus of claim 4, wherein the cam comprises an elongated rod having a generally circular cross section with at least one flat portion, each of the flat portions making contact with one of the pistons such that when the rod is rotated the pistons are moved.

7. The engraving apparatus of claim 4, wherein the shuttles include a relief such that when the cam operates to move the pistons, the pistons that do not contact the workpiece to be engraved do not contact the shuttles.

8. The engraving apparatus of claim 1, further comprising a plurality of springs, one of the springs being mounted externally to each of the plurality of workpiece storage columns, the springs exerting a biasing force on the workpieces stored in the workpiece storage columns.

9. An engraving apparatus, comprising:
   a plurality of workpiece storage columns, each of the storage columns capable of storing a plurality of blank workpieces;
   a plurality of shuttles, each of the shuttles operable to move one of the workpieces from each of the storage columns to an engraving location; and
   means for selectively clamping a workpiece during an engraving operation, the selective clamping means including at least one piston moveable between a clamping position in which the at least one piston clamps the workpiece against the shuttle and a released position in which the at least one piston does not contact the workpiece.

10. The engraving apparatus of claim 9, wherein the selective clamping means further includes a cam operable to move the piston between the clamping position and the released position.

11. The engraving apparatus of claim 9, further comprising an engraver, the engraver being movable into engagement with a shuttle having a selected workpiece to move the workpiece to the engraving location.

12. The engraving apparatus of claim 11, wherein the shuttle has a loading location, an engraving location, and a dispensing location, and the engraver is operable to move the shuttle between the loading, engraving, and dispensing locations.

13. An engraving apparatus, comprising:
   at least one workpiece storage column, each of the storage columns being configured to hold a plurality of blank workpieces;
   at least one shuttle configured to receive a workpiece to be engraved from the storage columns, the shuttle having a first opening, a bore, and a recess configured to receive the workpiece, the shuttle being movable between a loading position and an engraving position; and
   an engraver operable to engage the first opening in the shuttle to move the shuttle from the loading position to the engraving position.

14. The engraving apparatus of claim 3, wherein the head of the at least one piston has a raised surface made of a cushioning material that will contact the workpiece when the workpiece is clamped into position.

15. The engraving apparatus of claim 13, wherein the shuttle has a second opening and the engraver engages the second opening to move the shuttle between the engraving position and a dispensing position.

16. The engraving apparatus of claim 13, wherein the shuttle includes a first groove having a width greater than the width of the engraver, the groove being positioned on the shuttle such that the engraver can engage the groove to move the shuttle.

17. The engraving apparatus of claim 16, wherein the shuttle has a second groove having a width greater than the width of the engraver, wherein the engraver engages the first groove to move the shuttle from a dispensing position to the engraving position and the engraver engages the second groove to move the shuttle from the engraving position to the loading position.

18. The engraving apparatus of claim 13, wherein the recess in each of the shuttles is of substantially the same shape as the workpiece stored in a corresponding workpiece storage column.

19. The engraving apparatus of claim 13, wherein the apparatus further comprises:

a plurality of springs, one of the springs mounted externally to each of the storage columns such that the spring exerts a force upon the plurality of workpieces in the storage column thereby urging the workpieces toward one end thereof.

20. The engraving apparatus of claim 19, wherein the spring is a positive gradient variable force spring.

21. The engraving apparatus of claim 19, further comprising:

a lift plug positioned within each of the storage columns beneath a stack of workpieces; and a slide assembly positioned externally to each of the storage columns in operable connection with the corresponding lift plug, the slide biased by a corresponding spring to urge the lift plug and workpieces to the end of the storage column adjacent the loading position of the shuttle.

22. The engraving apparatus of claim 21, wherein the lift plug includes a transversely mounted rod that slides within a slot formed in the workpiece storage column, the slide assembly connected to the rod such that the lift plate moves in a manner corresponding to movement of the slide.

23. The engraving apparatus of claim 3, wherein the head of each piston includes an open bore.

* * * * *

UNITED STATES PATENT AND TRADEMARK OFFICE
CERTIFICATE OF CORRECTION

PATENT NO. : 6,059,495
DATED : May 9, 2000
INVENTOR(S) : Mueller et al.

It is certified that error appears in the above-identified patent and that said Letters Patent is hereby corrected as shown below:

Claim 23, column 12, penultimate line, change "claim 3" to --claim 14--.

Signed and Sealed this

Twentieth Day of February, 2001

Attest:

NICHOLAS P. GODICI

Attesting Officer    Acting Director of the United States Patent and Trademark Office